(12) United States Patent
Tsue et al.

(10) Patent No.: US 7,586,524 B2
(45) Date of Patent: *Sep. 8, 2009

(54) APPARATUS, METHOD, AND PROGRAM FOR EDITING IMAGES

(75) Inventors: Takashi Tsue, Kanagawa-ken (JP); Koichi Yamada, Kanagawa-ken (JP); Akira Yoda, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 705 days.

This patent is subject to a terminal disclaimer.

(21) Appl. No.: 10/998,145

(22) Filed: Nov. 29, 2004

(65) Prior Publication Data

US 2005/0185202 A1    Aug. 25, 2005

(30) Foreign Application Priority Data

Nov. 27, 2003  (JP) .............................. 2003-396851
Nov. 22, 2004  (JP) .............................. 2004-337601

(51) Int. Cl.
*H04N 5/76* (2006.01)
*G06K 9/00* (2006.01)

(52) U.S. Cl. ................................... 348/231.2; 382/165
(58) Field of Classification Search .............. 348/231.2; 382/165

See application file for complete search history.

(56) References Cited

U.S. PATENT DOCUMENTS 6,396,963 B2 *  5/2002  Shaffer et al. ............... 382/305
6,636,648 B2 * 10/2003  Loui et al. .................. 382/284
7,054,508 B2 *  5/2006  Hanamoto ................... 382/305
7,262,778 B1 *  8/2007  Edwards et al. ............. 345/589
7,327,905 B2 *  2/2008  Tsue et al. .................. 382/305

FOREIGN PATENT DOCUMENTS

| JP | 9-214868 A | 8/1997 |
| JP | 2002-008050 A | 1/2002 |
| JP | 2003-182260 A | 7/2003 |

* cited by examiner

*Primary Examiner*—David L Ometz
*Assistant Examiner*—Dillon Durnford-Geszvain
(74) *Attorney, Agent, or Firm*—Sughrue Mion, PLLC

(57) ABSTRACT

When a photo album for an event such as a wedding ceremony is generated, images to be inserted in image insertion areas in a template can be selected easily. A professional photographer photographs a bride and groom on the wedding day and obtains a plurality of images. Characteristic quantities of scenes represented by the images are calculated, and the images are classified in image groups of respective scenes. The scenes, image groups and image insertion areas of the template for album are related to each other. An event bar is displayed on an editing screen. When a desired scene button is selected, a catalog of images of an image group corresponding to the scene represented by the selected scene button, and the image insertion areas of the template are displayed on the editing screen.

19 Claims, 11 Drawing Sheets

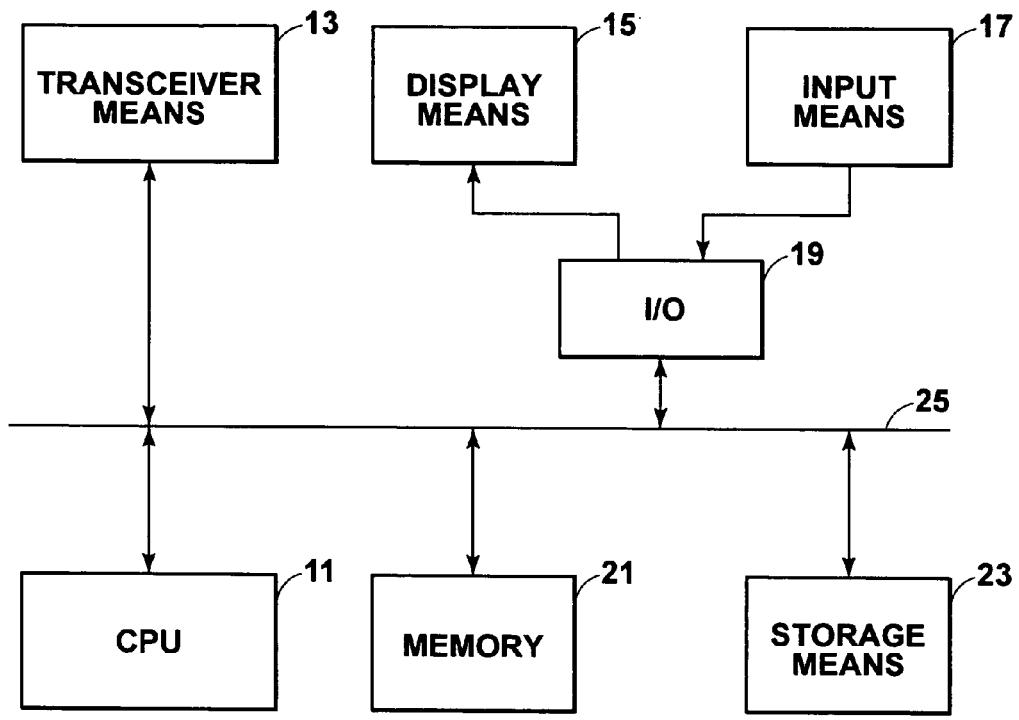
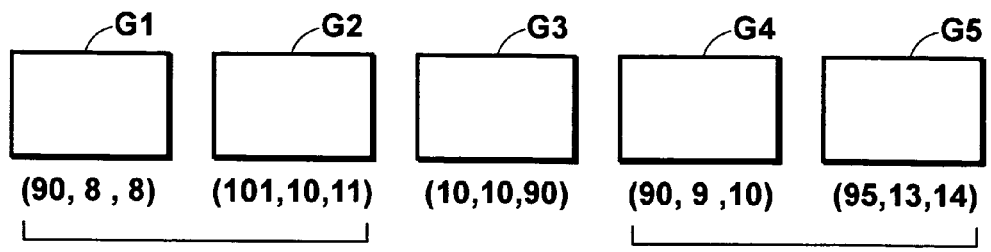

| EVENT NAME | REFERENCE VALUE SEQUENCE |
|---|---|
| WEDDING CEREMONY 1 | 1(100,10,10), 2(10,10,100), 3(10,100,10) |
| WEDDING CEREMONY 2 | 1(20,100,20), 2(10,10,100), 3(30,30,100) |
| ⋮ | ⋮ |

| T1 | | T2 | |
|---|---|---|---|
| 1-a | (100,10,10) | 1-a | (60,60,10) |
| 1-b | (10,10,100) | 1-b | (20,30,40) |
| 1-c | (10,100,10) | 1-c | (10,100,10) |
| — | — | 1-d | (10,10,100) |
|  |  |  |  |

| SCENE | IMAGE GROUP | IMAGE INSERTION AREA |
|---|---|---|
| 1 | A | 1-a |
| 2 | C | 1-b |
| 3 | B | 1-c |

```
TEMPLATE T1

1-a   :DSCF0012.jpg
    1-b   :DSCF0020.jpg
    1-c   :DSCF0023.jpg
```

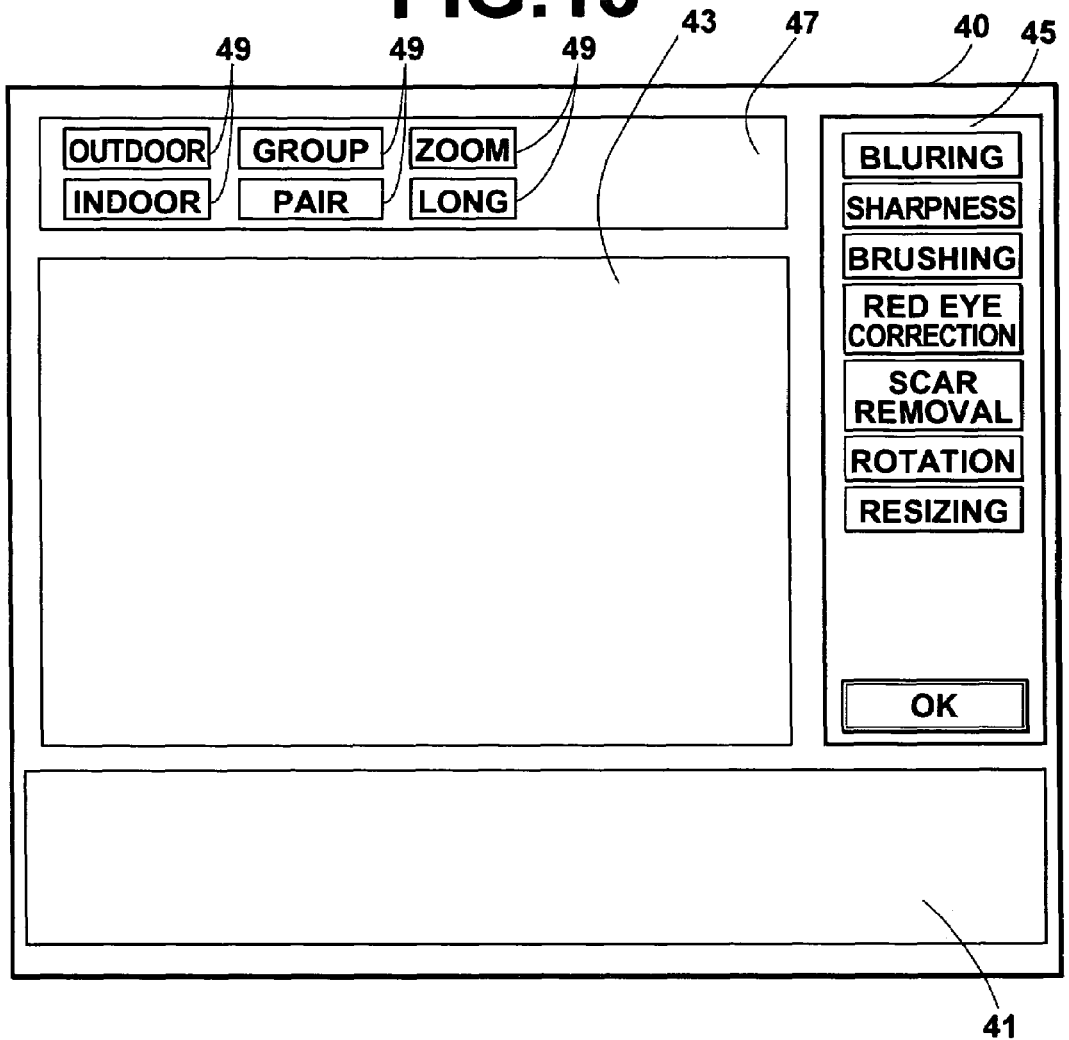

LIGHT BLUE

APPARATUS, METHOD, AND PROGRAM FOR EDITING IMAGES

BACKGROUND OF THE INVENTION

1. Field of the Invention

The present invention relates to an image editing apparatus and an image editing method for selecting an image to be inserted in an image insertion area in a template. The present invention also relates to a program for causing a computer to execute the image editing method.

2. Description of the Related Art

A method has been proposed for generating a photo album by reading images from a film with a film scanner and by printing an image including a selected part of the images arranged in desired layout as described, for example, in Japanese Unexamined Patent Publication No. 9 (1997)-214868.

In addition, another method has also been proposed as described, for example, in Japanese Unexamined Patent Publication No. 2003-182260 for generating a photo album by printing desired images as photographs and by inserting the photographs in photo mounting corners formed on photo album paper according to a size of the photographs and layout of the photo album.

Meanwhile, in order to generate a photo album of a wedding ceremony, a professional photographer sometimes photographs the bride and groom as well as attendants in front of a church as a venue for the wedding ceremony or in front of a monument during the wedding ceremony. Images obtained in this manner are used for generating a photo album, and the photo album tells a story that can be enjoyed later, since the album traces the behavior of the bride and groom on the wedding day.

In order to generate a photo album, a professional photographer or an operator at a DPE store that provides a photo album generation service (hereinafter collectively referred to as an operator) stores images obtained by photography in an image server, and displays on display means such as a monitor of a workstation a catalog of the images stored in the image server and a template having an image insertion area used for photo album generation. The operator then selects one of the images to be inserted in the image insertion area from the catalog. At this time, the operator carries out image editing processing such as processing for changing image quality (blurring or sharpness enhancement, for example), processing for image reshaping (such as rotation, resizing, and trimming), and processing for image restoration (such as red-eye correction and scar removal) on the selected image so that the image inserted in the image insertion area may look attractive.

A photo album is generated by printing images edited in the above manner and pasting the images on photo album paper. A photo album may also be generated by printing composite images having a layout of the photo album generated from edited images inserted in image insertion areas of a template as described, for example, in Japanese Unexamined Patent Publication No. 9 (1997)-214868.

In the case where a photo album is generated in the above manner, hundreds of images are obtained by photography on an event such as a wedding ceremony. Therefore, an operator is heavily burdened with selection of an image to be inserted in an image insertion area of a template from a catalog including the hundreds of images.

SUMMARY OF THE INVENTION

The present invention has been conceived based on consideration of the above circumstances. An object of the present invention is therefore to enable easy selection of an image to be inserted in an image insertion area of a template for generating a photo album especially for an event such as a wedding ceremony.

A first image editing apparatus of the present invention comprises:

a display means for displaying various types of information;

an input means for receiving input for a template comprising a plurality of pages and having a plurality of image insertion areas for inserting information that indicates a predetermined event including a plurality of scenes, a plurality of images of the predetermined event, and images corresponding to respective scenes of the plurality of scenes included in the predetermined event;

an image group generating means for generating image groups by classifying the plurality of images into respective scenes of the plurality of scenes included in the predetermined event;

a scene selecting means for receiving a selection of desired scene from among the plurality of scenes;

an image display control means for generating a catalog of images classified in an image group that corresponds to the selected scene, and for displaying the catalog on the display means;

a template display control means for displaying a page of the template having an image insertion area for inserting an image that corresponds to the selected scene on the display means; and an image selecting means for receiving a selection of image to be inserted into the image insertion area from the catalog.

In the image editing apparatus according to the present invention, if the template includes a plurality of pages having a color corresponding to at least one of the plurality of scenes, the template display control means may be a means for further displaying a page having the color corresponding to the selected scene on the display means.

In the image editing apparatus according to the present invention, if the plurality of scenes is the scenes representing various formal activities conducted within the predetermined event, the scene selecting means of the image editing apparatus of the present invention may be a means for displaying a plurality of scene buttons, each representing each of the plurality of scenes, on the display means, in the order in which the formal activities took place within the event, and for receiving a selection of scene button from among the plurality of scene buttons displayed on the display means.

Further, the scene selecting means of the image editing apparatus of the present invention may be a means for displaying a plurality of scene buttons, each representing each of the plurality of scenes, on the display means, and for receiving a selection of scene button from among the plurality of scene buttons displayed on the display means.

An image editing method of the present invention comprises the steps of:

receiving input for a template comprising a plurality of pages and having a plurality of image insertion areas for inserting information that indicates a predetermined event including a plurality of scenes, a plurality of images of the predetermined event, and images corresponding to respective scenes of the plurality of scenes included in the predetermined event;

generating image groups by classifying the plurality of images into respective scenes of the plurality of scenes included in the predetermined event;

receiving a selection of desired scene from among the plurality of scenes;

generating a catalog of images classified in an image group that corresponds to the selected scene, and displaying the catalog on a display means;

displaying a page of the template having an image insertion area for inserting an image that corresponds to the selected scene on the display means; and receiving a selection of image to be inserted into the image insertion area from the catalog.

The image editing method of the present invention may be provided in the form of a program for causing a computer to execute the image editing method.

According to the image editing method and apparatus, when input is received for a template comprising a plurality of pages and having a plurality of image insertion areas for inserting information that indicates a predetermined event including a plurality of scenes, a plurality of images for the predetermined event, and images corresponding to respective scenes of the plurality of scenes included in the predetermined event, a plurality of images are classified in a plurality of scenes included in the predetermined event and a plurality of image groups are generated. Then, when a selection of desired scene from among the plurality of scenes is received, a catalog of images classified in an image group corresponding to the selected scene is generated, and the catalog is displayed on a display means. Further, a page of the template having an image insertion area for inserting an image corresponding to the selected scene is also displayed on the display means. Thus, the display means displays only the catalog of images classified in an image group corresponding to the selected scene and the page of the template having an image insertion area for inserting an image corresponding to the selected scene. Therefore, an operator who carries out image editing may easily select the images to be inserted into the image insertion area displayed on the display means by referring to the catalog. Consequently, a burden on the operator may be reduced at the time of selecting the images for insertion into the image insertion areas of the template.

Here, even if the scene is the same, the color of the costumes of persons included in the scene differs according to the taste of the user in some cases. Further, the color of the background is changed according to the costume or pose selected by the user during photography in some cases. Therefore, when the template includes a plurality of pages having a color corresponding to at least one of a plurality of scenes, if a page having a color corresponding to the selected scene is displayed, an attractive photo album, which corresponds to various scenes, may be produced. Further, since it is not necessary to prepare a plurality of templates according the scenes, the templates can be managed efficiently.

Further, if the plurality of scenes is the scenes representing various formal activities conducted within the predetermined event, a plurality of scene buttons, each representing each of the plurality of scenes, may be displayed on the display means in the order in which the formal activities took place within the event. Thus, image selection according to the formal activities may be carried out with ease. Further, the images to be inserted into the image insertion area of the template may be selected for each of the formal activities conducted within the event.

Still further, a plurality of scene selecting buttons, each representing each of the plurality of scenes, may be displayed on the display means to facilitate the selection of the scenes.

BRIEF DESCRIPTION OF THE DRAWINGS

FIG. 2 is a schematic block diagram illustrating a configuration of a photo album editing PC.

FIG. 3 is a drawing for describing classification of image data.

FIG. 6 is a drawing illustrating an example of a template reference value table.

FIG. 7 is a drawing illustrating an example of a correspondence table.

FIG. 13 is a drawing illustrating another example of an initial editing screen.

FIG. 14 is a diagram illustrating an example of a correspondence table among event scenes, image groups, image insertion areas, page numbers in a template, and color information in the second embodiment.

DESCRIPTION OF THE PREFERRED EMBODIMENTS

Figure 1:
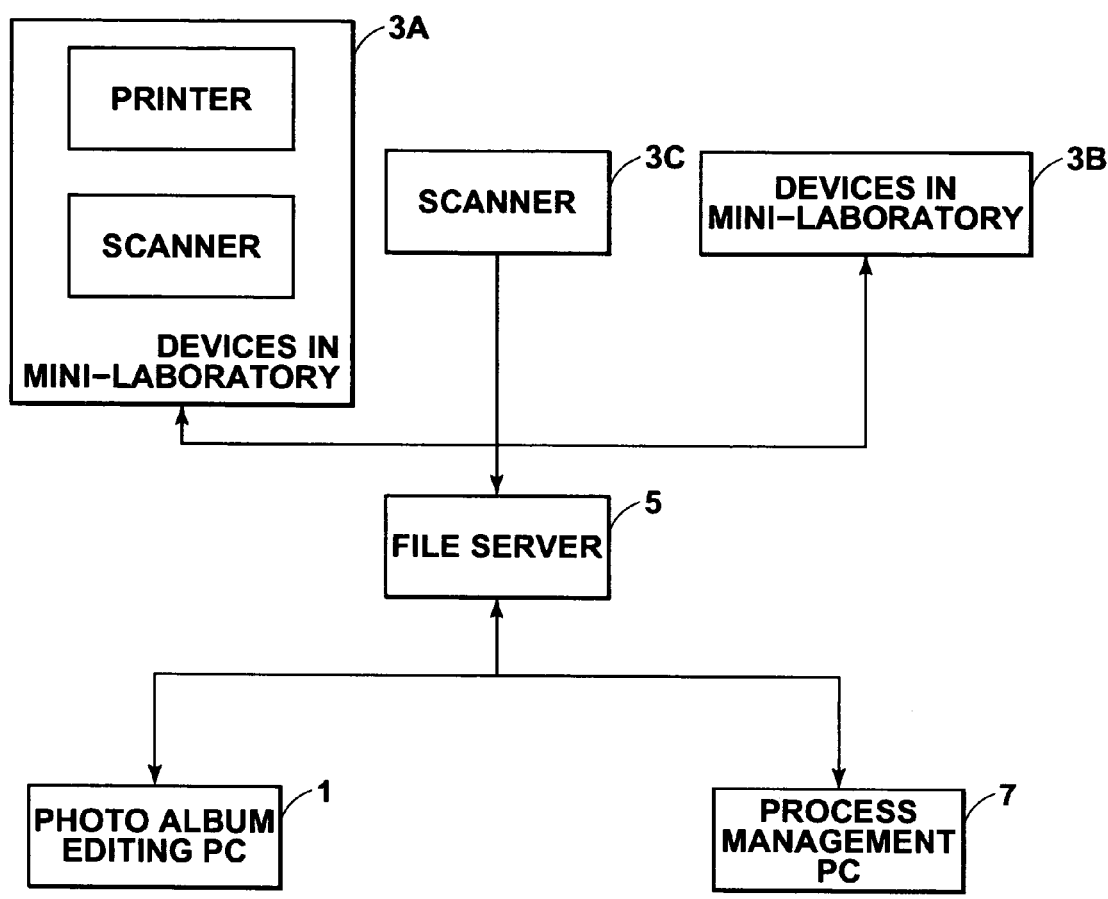
FIG. 1 is a schematic block diagram illustrating the configuration of an image editing system having an image editing apparatus according to an embodiment of the present invention.

Hereinafter, embodiments of the present invention will be described with reference to the accompanying drawings. FIG. 1 is a schematic block diagram illustrating the configuration of an image editing system having an image editing apparatus according to a first embodiment of the present invention. As shown in FIG. 1, the image editing system of the embodiment comprises a photo album editing PC 1; a plurality (2, in this case) of mini-laboratories 3A and 3B; a scanner 3C; a file server 5; and a process management PC 7, which are connected to each other via a network. The photo album editing PC 1 has the capability of the image editing apparatus according to the embodiment of the present invention. Each of the mini-laboratories 3A and 3B has a scanner for obtaining image data representing images recorded on a developed film by reading the images from a negative or positive film, or a print, and a printer for printing out image data. The file server 5 has a hard disc of large-capacity for storing the image data. The process management PC 7 performs flow control of photo album generation.

In the present embodiment, a wedding ceremony is assumed to be the event. In the wedding ceremony, a professional photographer photographs the bride and groom who requested generation of a photo album (hereinafter referred to as a user) on the day of wedding ceremony, and the photographer generates a photo album telling a story of the event by using the images. However, the event is not necessarily limited to the wedding ceremony.

FIG. 2 is a schematic block diagram illustrating the configuration of the photo album editing PC 1. As shown in FIG. 2, the photo album editing PC 1 comprises a CPU 11 (acting as the image group generating means, image display control means, template display control means); a transceiver means 13 (acting as the input means); a display means 15; an I/O 19; a memory 21; and a storage means 23. The CPU 11 assumes control of the entire operation of the photo album editing PC 1. The transceiver means 13 sends and receives various types of information including the image data to and from the file server 5 through the network. The display means 15 displays various types of information such as the images and the template. The I/O 19 reads various types of information inputted by an operator of the photo album editing PC 1 via input means 17 (acting as the scene selecting means and image selecting means) for delivering the information to the CPU 11. The I/O 19 also outputs a display instruction to the display means 15 according to an instruction from the CPU 11. The memory 21 comprises a ROM for storing a program for operating the CPU 11 and various constants, and a RAM used by the CPU 11 as a workspace. The storage means 23 comprises a hard disc for storing various types of information such as the image data.

A bus 25 connects the CPU 11 of the photo album editing PC 1 to peripheral circuits including the transceiver means 13, I/O 19, memory 21, and storage means 23. In this manner, the CPU 11 is able to control the peripheral circuits. More specifically, the CPU 11 controls the transceiver means 13, display means 15, memory 21, and storage means 23 for reception of information such as the image data and template data which will be explained later from the file server 5, for storing the image data in the storage means 23, and for displaying a catalog and the template on the display means 15 in order to select a part of the images for insertion in the image insertion area of the template, to generate image editing information, and to transmit the image editing information to the file server 5 in response to the instruction from the operator through the input means 17.

When the photo album editing PC 1 receives the image data, the photo album editing PC 1 calculates characteristic quantities of the image scenes represented by the image data. In this embodiment, the characteristic quantities refer to averages of R, G, and B colors in the images represented by the image data. In other words, values of R, G, and B are respectively added for all pixels in each of the images for obtaining totals and the totals are divided by the number of the pixels for obtaining the characteristic quantities.

Here, the characteristic quantities of the scenes may be calculated for each of the images represented by the image data at the file server 5, and the characteristic quantities so calculated may be sent to the photo album editing PC1 together with the image data. Thereby, the load of the photo album editing PC1 may be reduced, since the photo album editing PC1 is not required now to calculate the characteristic quantities.

The photo album editing PC 1 then generates image groups by classifying the image data into the respective scenes according to the characteristic quantities calculated in the manner described above. More specifically, distances between the characteristic quantities of all the image data are calculated in a three-dimensional space (r, g, b), and the image data having the distances equal to or smaller than a predetermined threshold value Th1 are grouped together as one of the image groups. In the same image group, the image data represent the same scene represented by the characteristic quantities that are similar to each other.

In this embodiment, the characteristic quantities are calculated in the order of the file name of the image data. At this time, as shown in FIG. 3, in the case where image data G1 and G2 are classified in an image group A while an image data set G3 is classified in an image group B, if the image data G4 and G5 are also classified in the group A, the image data G3 may be classified in the image group A in consideration of scene continuity at the time of photography.

The storage means 23 stores a reference value sequence table that contains reference value sequences, each representing each of the scenes of a plurality of formal activities within an event, arranged in the order in which they took place for a plurality of events.

Figures 4, 5:
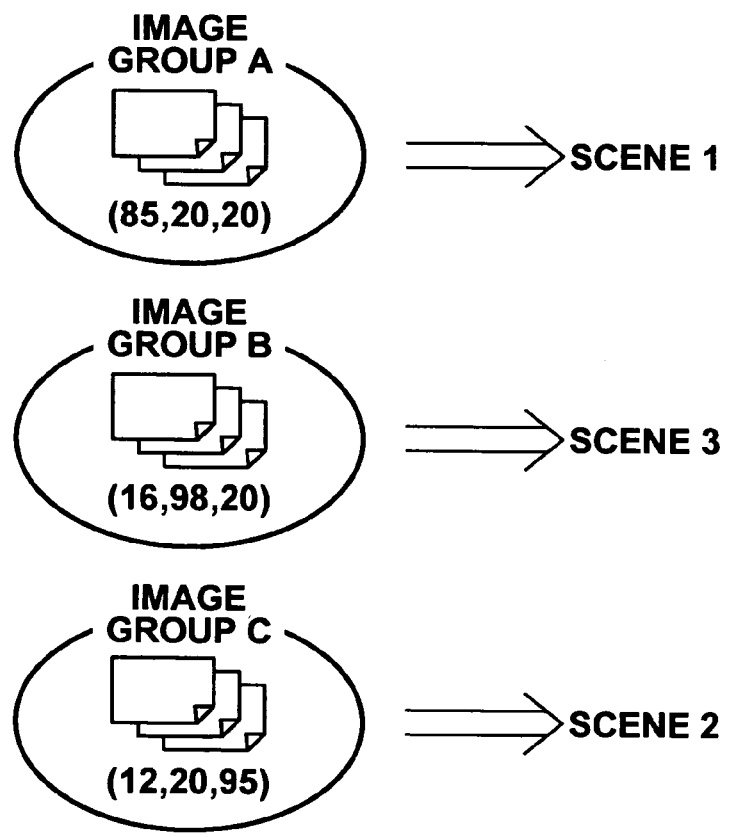
FIG. 4 is a drawing illustrating an example of a reference value sequence table.
FIG. 5 is a diagram illustrating an example of a correspondence table between image groups and scenes in the first embodiment.

FIG. 4 shows an example of the reference value sequence table. As shown in FIG. 4, a reference value sequence table OT1 describes the event names representing the respective events such as the wedding ceremony 1, wedding ceremony 2 and the like, and the reference values for the characteristic quantities of the scenes of the formal activities such as the exchange of wedding rings, wedding cake cutting, and speech delivery at the wedding party conducted within each of the event represented by the event name in the order in which they took place. For example, if three formal activities represented by the scenes 1, 2 and 3 took place in this order within the event under the event name of wedding ceremony 1, the reference values of (100,10,10), (10,10,100), and (10,100,10) for the characteristic amounts of scenes 1, 2 and 3 are described in this order. The reference values for the characteristic quantities may be found by calculating the averages of R, G, and B colors in images obtained by photography of each of the scenes.

The photo album editing PC 1 relates the classified image groups to the respective scenes by referring to the reference value sequence table OT1. FIG. 5 is a drawing for describing the correspondence between the image groups and the respective scenes. Here, in the present embodiment, the image data are assumed to be classified in the image groups A, B and C, and wedding ceremony 1 is assumed to be designated as the event.

The photo album editing PC 1 firstly calculates the averages of the characteristic quantities in the scenes of all the image data in the respective image groups A, B, and C. As shown in FIG. 5, the averages for the image group A are (85, 20, 20) while the averages for the image group B are (16, 98, 20). The averages for the image group C are (12, 20, 95). The photo album editing PC 1 calculates the distances in the three-dimensional space (r, g, b) between the averages of the characteristic quantities in each of the image groups A, B, and C and the reference values of the characteristic quantities of the scenes in wedding ceremony 1 in the reference value sequence table OT1. The photo album editing PC 1 relates the respective image groups to the scenes whose distances to the respective image groups are minimal. In this manner, the image group A is related to the scene 1, while the image groups B and C are related to the scenes 3 and 2 respectively.

Further, in the present embodiment, the scenes and image groups are related to the image insertion area of the template. For this, in the present embodiment, a template reference value table is stored in the storage means 23. The template reference value table describes scene reference values, which are the reference values for the characteristic quantities of the scenes to be inserted into each of the image insertion areas of the template, for a plurality of different types of templates.

FIG. 6 is a drawing illustrating an example of the template reference value table TT1. As shown in FIG. 6, the template reference value table TT1 describes the scene reference values for the image insertion areas such as 1-*a*, 1-*b*, and 1-*c* in each of the templates such as T1 and T2. For example, the template T1 has three image insertion areas 1-*a*, 1-*b*, and 1-*c*, and the scene reference values therefore are (100, 10, 10), (10, 10, 100), and (10, 100, 10), respectively. The reference values of the characteristic quantities of the scenes are found by averaging R, G, and B colors in images obtained by photography of the scenes.

Here, in the present embodiment, if the template T1 is designated by the user, the photo album editing PC1 relates the scenes 1, 2 and 3 of wedding ceremony 1, which is the event, to image insertion areas 1-*a*, 1-*b* and 1*c* by referring to the reference value sequence table OT1 and template reference value table TT1. In this way, the scene 1 is related to the image insertion area 1-*a*, scene 2 to the image insertion area 1-*b*, and scene 3 to the image insertion area 1-*c*. In the mean time, as described above, the scenes 1, 2 and 3 of the wedding ceremony 1 have been related to the image groups A, C and B. Thus, the photo album editing PC1 may generate a correspondence table C0 that relates the scenes of the event, image groups and image insertion areas to each other as shown in FIG. 7. The correspondence table C0 shown in FIG. 7 indicates that the scene 1 is related to image group A and image insertion area 1-*a*, the scene 2 to image group C and image insertion area 1-*b*, and the scene 3 to image group B and image insertion area 1-C.

The photo album editing PC1 generates the correspondence table C0 in this manner, and thereafter displays an initial editing screen.

Figure 8:
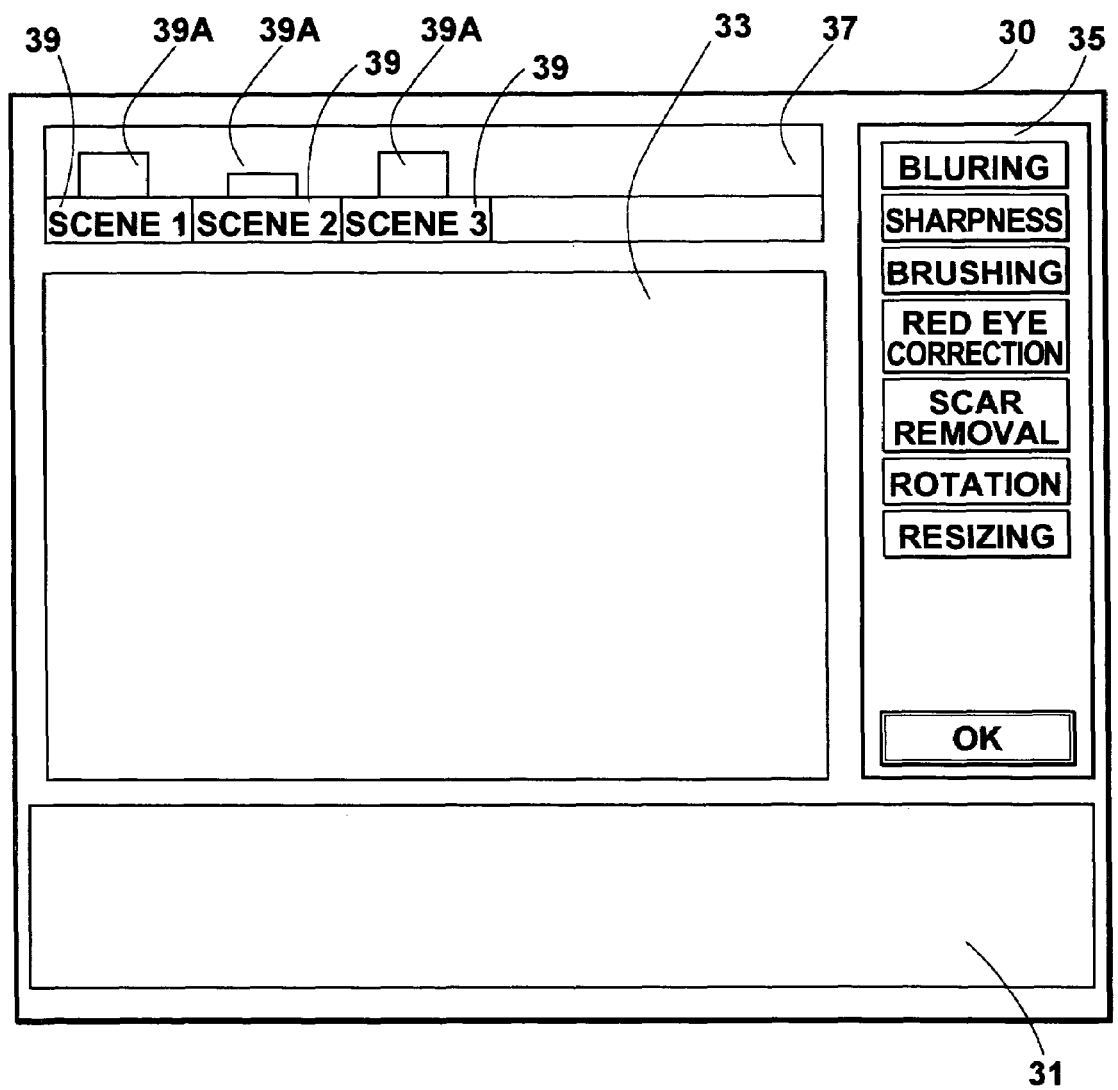
FIG. 8 is a drawing illustrating an example of an initial editing screen.

FIG. 8 is a drawing illustrating an example of the initial editing screen. As shown in FIG. 8, the initial editing screen 30 includes a catalog display field 31 for displaying the image catalog, a template display field 33 for displaying the template having a guide image inserted therein, a tool box 35, and an event bar 37.

First, the event bar will be described. The event bar 37 has a plurality of scene buttons for selecting one of the scenes of formal activities conducted within the event of wedding ceremony 1, which are arranged in the order in which the formal activities took place within the event. Further, each of the scene buttons 39 has a bar graph 39A showing a rough number of images in the group classified in the scene. When the operator clicks on a desired scene button on the event bar to select the desired scene, the photo album editing PC1 generates a catalog of images represented by the image data classified in the image group that corresponds to the scene selected by the operator, and displays the image catalog in the catalog display field 31, and further displays a page of the template T1 containing the image insertion area that corresponds to the scene selected by the operator in the template display field 33 by referring to the correspondence table C0.

Figures 9, 10:
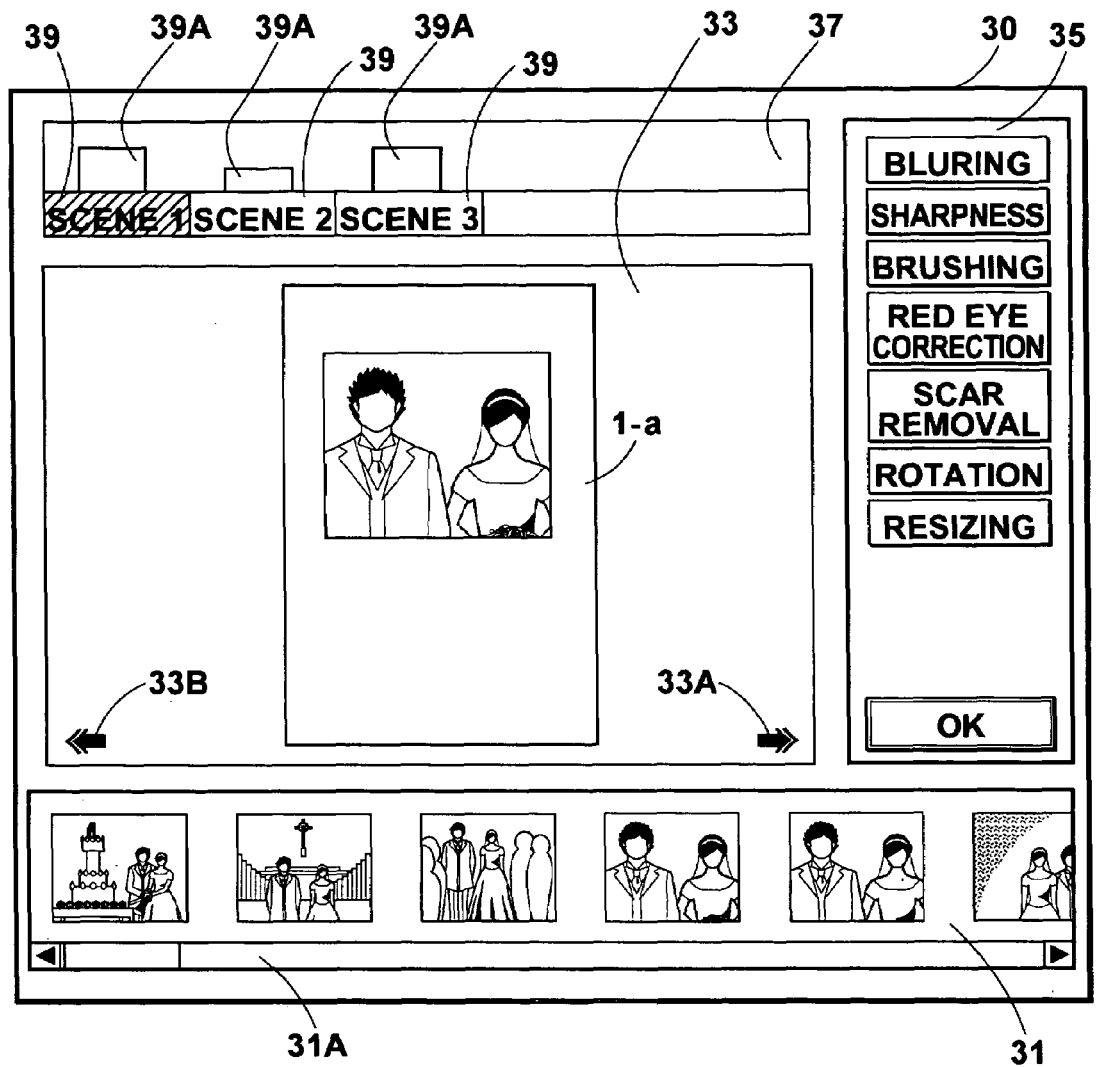
FIG. 9 is a drawing illustrating an example of an editing screen.
FIG. 10 is a drawing illustrating an example of layout information.

FIG. 9 is a drawing illustrating an editing screen with the image catalog and template displayed thereon. Here, the scene button 39 for the scene 1 on the event bar 37 is assumed to have been clicked and the scene 1 has been selected. As shown in FIG. 9, on the editing screen 30', the color of the scene button 39 for the scene 1 on the event bar 37 has been changed, and the catalog of images represented by the image data classified in the image group A that corresponds to the scene 1 is displayed in the catalog display field 31. The editing screen 30' also displays the page of the template T1 containing the image insertion area 1-*a* that corresponds to the scene 1 in the template display field 33.

A scroll bar 31A is displayed in the catalog display field 31, and the images that are not displayed on one screen may be displayed by moving the scroll bar 31A to the right or left.

Further, a guide image is displayed on the image insertion area 1-*a*, which is displayed in the template display field 33.

The guide images may notify the operator who carries out the photo album editing of what composition the respective images should have in the corresponding image insertion areas 1-*a*, 1-*b*, 1-*c* of the template. In the case of photography for generating photo albums on events, the photography is carried out at the same place and in the same situation regardless of who a user as a requester is. For example, in the case of photography of brides and grooms in wedding ceremony, photography is carried out at a predetermined place in a hotel and in a predetermined situation such as the exchange of wedding rings and wedding cake cutting.

Therefore, by using the same composition for the images to be inserted in the image insertion areas 1-*a*, 1-*b*, 1-*c* of the template for all users who selected the same template, a quality of photo albums generated in the above manner can be constant. Consequently, the guide images can be illustrations representing the composition to be inserted in the image insertion areas, drawings, or sample images obtained by photography of a model in the same place or in the same situation, for example. In the present embodiment, sample images generated by photographing a model are inserted in the image insertion areas 1-*a*, 1-*b*, 1-*c*.

In the template display field 33 are displayed arrow buttons 33A and 33B for changing a page of the template being displayed in the template display field 33 in the case where the template has a plurality of pages. The operator can change the page of the template to be displayed on the editing screen 30' by clicking on the arrow button 33A or 33B.

In the tool box 35 are displayed buttons for carrying out image quality changing processing such as blurring, sharpening, and brushing, buttons for carrying out image restoration processing such as red-eye correction and scar removal, and buttons for carrying out image reshaping processing such as rotation and resizing, as well as an OK button for ending the processing.

The operator carries out the photo album editing operation by inputting photo album editing instructions while using the editing screen 30'. More specifically, the operator selects one of the images having the same composition as the guide image inserted in one of the image insertion areas from the catalog, and drags and drops the selected image by using the input means 17. In this manner, the operator inserts the selected image in the corresponding image insertion area. After the insertion, the operator may select the image insertion area for editing the selected image inserted therein by clicking on any one of the buttons in the tool box 35. For example, by clicking on the button for rotation, the operator can rotate the image by 90 degrees in the clockwise direction. By clicking on the button for resizing, the operator can change a size of the image. Furthermore, by clicking on the button for blurring or sharpening or brushing, the quality of the image may be changed. By clicking on the button for red-eye correction or scar removal, the image may be restored.

After completing the image selection for all the images to be inserted in the respective image insertion areas and editing of all the selected images by clicking on the scene buttons 39 on the event bar 37 sequentially to select respective scenes and displaying all the image insertion areas, the operator clicks on the OK button for completing the photo album editing using the template. In response to clicking on the OK button, the photo album editing PC 1 generates the image editing information including the file names of the selected images, information relating the file names of the images to be inserted in the respective image insertion areas and the corresponding image insertion areas, information on the processing to be carried out on the image data such as blurring, reduction or enlargement, and red-eye correction, information on an area to be trimmed in the case of trimming, and information on a magnification ratio in the case of reduction or enlargement. The image editing information is sent to the file server 5.

The file server 5 stores the image data obtained by reading the images recorded on the developed film by using the scanner 3C or the scanner in the mini-laboratory 3A or 3B. The image data are recorded in a folder created for each of the users who requested generation of the photo album. The file server 5 also stores the template data representing templates to be used for photo album generation, as well as the guide image data to be inserted into the image insertion areas of the templates.

The file server 5 refers to the photo album editing information sent from the photo album editing PC 1, and sends the template data representing the template selected by the user, the image data stored in the folder corresponding to the user ID, and the guide image data representing the guide images to be inserted in the image insertion areas in the selected template to the photo album editing PC 1.

When the image editing information is received from the photo album editing PC 1, the file server 5 refers to the file names of the image data representing the selected images contained in the image editing information, and carries out preparatory processing and editing processing on the selected image data for generating processed image data. The preparatory processing includes at least one of brightness correction processing, color correction processing and gradation correction processing on the selected image data. The editing processing includes the processing specified by the image editing information. More specifically, the editing processing includes the processing for changing image quality such as blurring, sharpening, and brushing, the image reshaping processing such as trimming and enlargement/reduction processing, and the image restoration processing such as red-eye correction and scar removal on the image data specified by the image editing information.

The file server 5 generates layout information from the information relating the file names of the image data and the image insertion areas of the template contained in the image editing information. FIG. 10 is a drawing illustrating an example of the layout information. As shown in FIG. 10, the layout information indicates the relation between the image insertion areas 1-*a*, 1-*b*, 1-*c* of the template T1 and respective file names of the image data (DSCF0012.jpg, DSCF0020.jpg, and DSCF0023.jpg) to be inserted in the image insertion areas. The file server 5 sends the processed image data and the layout information to either of the mini-laboratory 3A or 3B.

The process management PC 7 receives information representing completion of the processes such as the photo album editing operation, printing, and photo album inspection inputted by the operator, in order to manage the processing regarding photo album generation. In the case where the photo album has passed the inspection carried out by the operator for examining the quality of the generated photo album, the process management PC receives information thereon, and finishes the process management for the photo album. In the case where the photo album did not pass the inspection, the process management PC 7 receives an instruction for regenerating the photo album.

Figure 11:
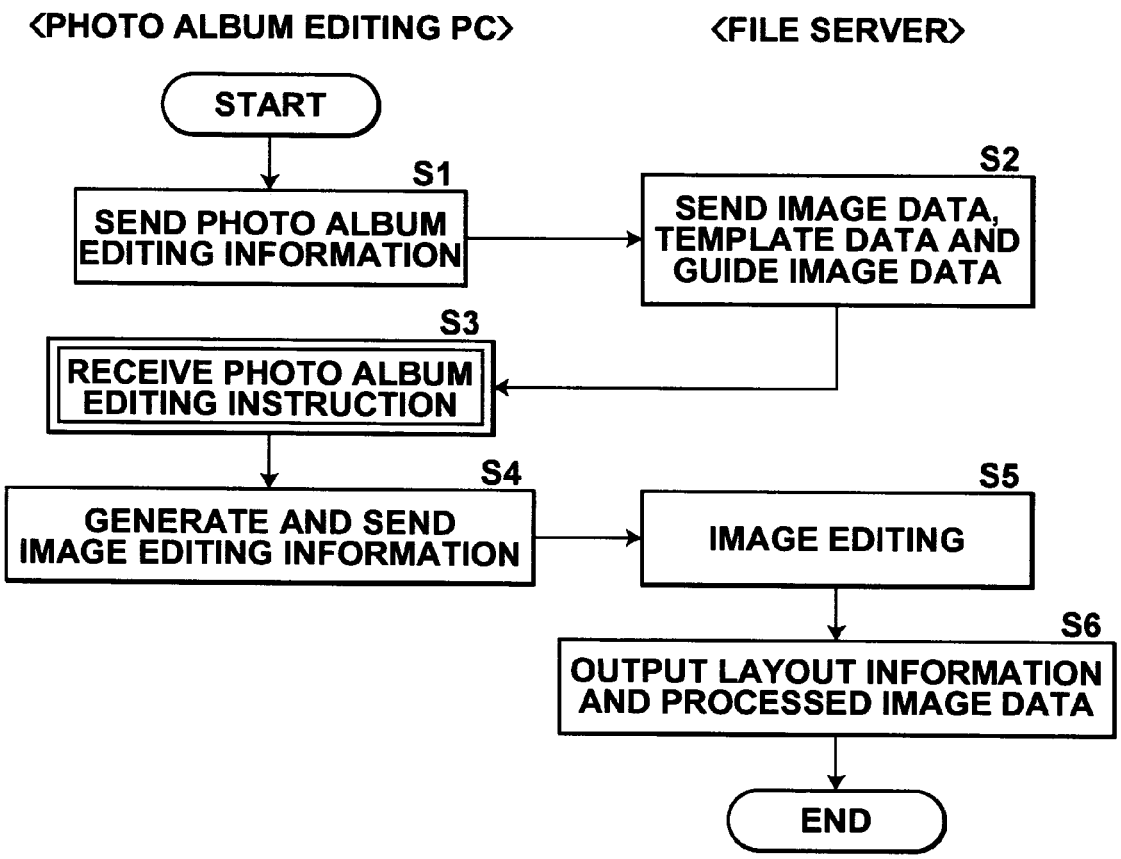
FIG. 11 is a flow chart illustrating a process carried out in an embodiment of the present invention.

Hereinafter, the processing performed in the first embodiment will be described. FIG. 11 is a flow chart illustrating the process flow in the first embodiment. The file server 5 has already stored the image data obtained by reading the images from the developed film recorded with photographs on the wedding ceremony of the user. The photo album editing information comprising the user ID and the information on the template selected by the user has already been inputted. The type of event for which the user requested photo album generation has also been inputted.

The process starts with the instruction from the operator for editing the photo album through the photo album editing PC 1. The photo album editing PC 1 sends the photo album editing information including the user ID and the information on the template selected by the user to the file server 5 (Step S1).

The file server 5 receives the photo album editing information, and sends the image data stored in the folder corresponding to the user ID, the template data representing the template selected by the user, and the guide image data representing the guide images to be inserted in the image insertion areas of the template to the photo album editing PC 1 (Step S2).

The photo album editing PC 1 receives the image data, template data, and guide image data, and performs the processing for receiving the album editing instruction (Step S3).

Figure 12:
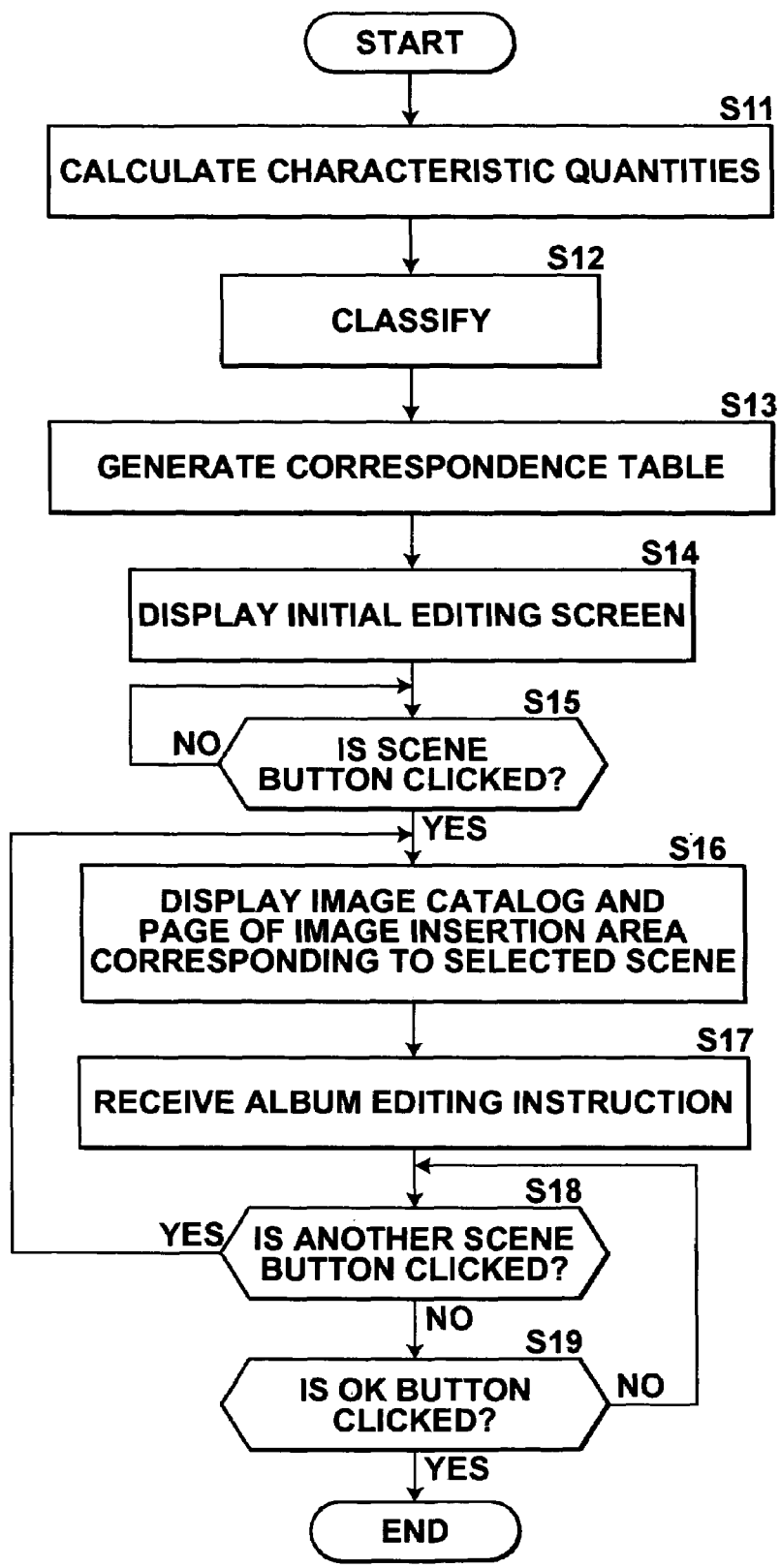
FIG. 12 is a flow chart illustrating a process for receiving album editing instructions.

FIG. 12 is a flow chart illustrating the processing for receiving the album editing instruction. First, the photo album editing PC 1 calculates the characteristic quantities of the scenes of a plurality of image data (Step S11). The photo album editing PC 1 generates a plurality of image groups by classifying the plurality of image data into the respective scenes according to the characteristic quantities (Step S12). Then, the photo album editing PC 1 generates the correspondence table C0 that relates the image groups, scenes, and templates by referring to the reference value sequence table OT1 and template reference value table TT1 stored in the storage means 23 (step S13). Thereafter, the photo album editing PC1 displays the initial editing screen shown in FIG. 8 on the display means (step S14).

Then, the photo album editing PC1 starts monitoring to see if one of the scene buttons 39 on the event bar 37 is clicked by the operator (step S15). If the step S15 is positive, it generates a catalog of images represented by the image data classified in the image group corresponding to the scene selected by the operator by clicking on the scene button 39, and displays the image catalog in the catalog display field 31. It also displays the template page of image insertion area, which corresponds to the scene selected by the scene button 39, in the template display field 33 (step S16). In addition, a guide image represented by the guide image data is inserted in the image insertion area of the template, which is displayed in the template display field 33.

The photo album editing PC1 receives the photo album editing instruction from the operator with reference to the editing screen 30 (step S17). Then, it determines whether another scene button 39 on the even bar is clicked by the operator (step S18). If step 18 is positive, the process returns to step S16 to generate a catalog of images represented by the image data classified in the image group corresponding to the scene selected by clicking on another scene button 39, and to display the image catalog in the catalog display field 31 and the template page of image insertion area in the template display field 33, which correspond to the scene selected by clicking on another scene button 39.

If step S18 is negative, the photo album editing PC1 determines whether the OK button is clicked (step S19). If step S19 is negative, the process returns to step S18. If step S19 is positive, the photo album editing PC1 terminates the process for accepting the photo album editing instruction.

Turning back to FIG. 11, the photo album editing PC 1 generates image editing information and sends it to the file server 5 (step S4).

The file server 5 receives the image editing information, and performs the editing process by referring to the file names of the selected image data contained in the image editing information (Step S5). The file server 5 sends the processed image data generated through the editing process and the layout information generated from the image editing information to either of the mini-laboratory 3A or 3B (Step S8), and terminates the editing process.

The mini-laboratory 3A or 3B receives the processed image data and the layout information, and prints out the processed image data for generating printouts thereof. The operator (or an operator dedicated to photo album binding) pastes the printouts in print insertion areas in photo album paper corresponding to the template by referring to the layout information, and carries out binding and the like for generating the photo album.

The operator in charge of quality control inspects the photo album generated in this manner. In the case where the photo album has passed the inspection, the photo album is sent to the user. In the case where the photo album has not passed the inspection, the instruction is inputted from the process management PC 7 for regenerating the photo album.

As has been described above, in the present embodiment, when a desired scene is selected by the operator through the event bar, the photo album editing PC1 displays the image catalog and image insertion area of the template, which correspond to the selected scene, on the editing screen 30' by referring to the correspondence table C0 that relates the scenes, image groups, and image insertion areas of the template. Therefore, the editing operator may readily select the image to be inserted into the image inserting area of the template displayed on the display means by referring to the image catalog. Thus, the burden on the editing operator may be reduced for selecting the image to be inserted into the image insertion area.

Further, the operator may perform image selection according to the formal activities by arranging the scene buttons 39 for the scenes of formal activities of the event on the event bar 37 in the order in which they took place.

In the embodiment described above, the correspondence table C0 is generated by classifying image data into respective scenes of formal activities conducted within the event and the scene buttons 39 corresponding to the scenes of formal activities are arranged on the event bar in the order in which they took place. However, the image data may be classified in scenes which are independent of the formal activities conducted within an event, such as the scene representing outdoor photographs, group photographs, zoomed photographs, indoor photographs, and the like. In this case, the reference values described in the reference value sequence table OT1 are the values characteristic to the outdoor photographs, group photographs, and the like.

An initial editing screen in the case where the image data are classified in the scenes which are independent of the formal activities conducted within an event is shown in FIG. 13 as another example. FIG. 13 is a drawing illustrating another example of the initial editing screen. As shown in FIG. 13, the initial editing screen 40 includes a catalog display field 41 for displaying the image catalog, a template display field 43 for displaying the template having a guide image inserted therein, a tool box 45, and a scene button field 47.

The scene button field 47 includes scene buttons 49 indicating "outdoor", "indoor", "group", "pair", "zoomed", and "long" respectively, each of which represents image data group classified in the scene represented by the referent. When the operator clicks on a desired scene button in the scene button field 47 to select the desired scene, the photo album editing PC1 generates a catalog of images represented by the image data classified in the image group that corresponds to the scene selected by the operator, and displays the image catalog on the catalog display field 41, and further displays the template page containing image insertion area that corresponds to the scene selected by the operator on the template display field 43 by referring to the correspondence table C0. Thus, the operator may select the image to be inserted into the image insertion area of the template for each scene in the same manner as in the embodiment described above.

In the embodiment described above, the average of R, G, and B colors in the images represented by the image data are used as the characteristic quantities, which is not necessarily limited thereto. At least one of lightness, saturation, hue, image composition, and a subject type of the scenes represented by the images can be used as the characteristic quantities. More specifically, at least one of the color characteristics of each of the images (such as color balance in the entire image, an average lightness, an average saturation, a color variance representing variance in colors of pixels, a lightness histogram, a saturation histogram, and a hue histogram), a composition characteristic thereof (such as space frequency distribution), and a subject characteristic thereof (such as a proportion of face, sky, water, greens or the like in the image, a size of face, and a subject shape) can be used as the characteristic quantities.

Further, the method for classifying the image data into respective scenes is not limited to that in which the characteristic quantities of the images represented by the image data are used. The present invention may employ any method for this, including, for example, a method in which image data are arranged in the order in which they are obtained by referring to the information attached to the image data that indicates the date and time of photography, and classifying the image data in accordance with the date and time of photography.

In the embodiment as described above, even if the scene is the same, the color of the costumes of persons included in the scene differs according to the taste of the user in some cases. Further, the color of the background is changed according to the costume or pose selected by the user during photography in some cases. Specifically, if the background of the scene is light blue, it is preferable that the color of the template is light blue or a color similar to the light blue.

Therefore, when the template includes a plurality of pages having a color corresponding to at least one of a plurality of scenes, it is preferable that a page having a color corresponding to the selected scene is displayed. Hereinafter, this is called a second embodiment.

FIG. 14 is a table showing the correspondence among event scenes, image groups, image insertion areas, page numbers in a template, and color information. It is assumed that a template T3 is used in the second embodiment. The template T3 has 3 pages, and each of the pages has image insertion areas 1-*a*, 1-*b*, and 1-*c*, respectively. As illustrated in FIG. 14, in the correspondence table C1, the scene 1, the image group A, and the image insertion area 1-*a* are correlated with each other. The scene 2, the image group C, and the image insertion area 1-*b* are correlated with each other. The scene 3, the image group B, and the image insertion area 1-*c* are correlated with each other. Further, the scene 1, the image group A, and the image insertion area 1-*a* are correlated with pages 1-1 and 1-2 in the template. The scene 2, the image group C, and the image insertion area 1-*b* are correlated with pages 2-1 and 2-2 in the template. The scene 3, the image group B, and the image insertion area 1-*c* are correlated with pages 3-1 and 3-2 in the template. Further, pages 1-1 and 1-2 are correlated with light blue and pink, respectively. Pages 2-1 and 2-2 are correlated with yellow and pink, respectively. Pages 3-1 and 3-2 are correlated with light blue and yellow, respectively.

Here, it is assumed that the color information represents colors largely included in the pages of the template.

In the second embodiment, the photo album editing PC 1 judges the color of the background of each of the image groups A-C based on the average value of the characteristic value (r, g, b) in the scene of each of the image groups A-C. Then, the photo album editing PC 1 selects a page of the template T3 based on the judged color. For example, if the color of the background of the image group A is light blue, the color of the background of the image group B is pink, and the color of the background of the image group C is light blue, when an operator clicks each of the scenes 1, 2, and 3 in the editing screen, the photo album editing PC 1 selects pages 1-1, 2-2, 3-1, respectively. Then, the photo album editing PC 1 displays the selected pages in the template display field 33.

Meanwhile, if the color of the background of the image group A is pink, the color of the background of the image group B is yellow, and the color of the background of the image group C is yellow, when the operator clicks each of the scenes 1, 2, and 3 in the editing screen, the photo album editing PC 1 selects pages 2-1, 2-1, 3-2, respectively. Then, the photo album editing PC 1 displays the selected pages in the template display field 33.

Figure 15A:
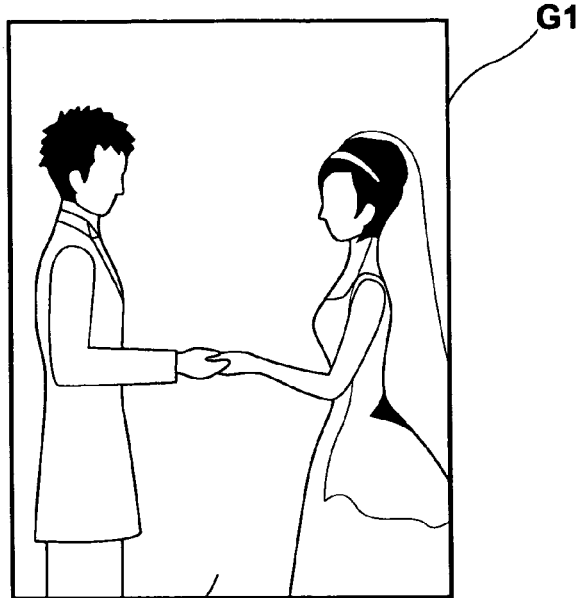
FIG. 15A is a diagram illustrating an example (No. 1) of album edit in the second embodiment.
Figure 15B:
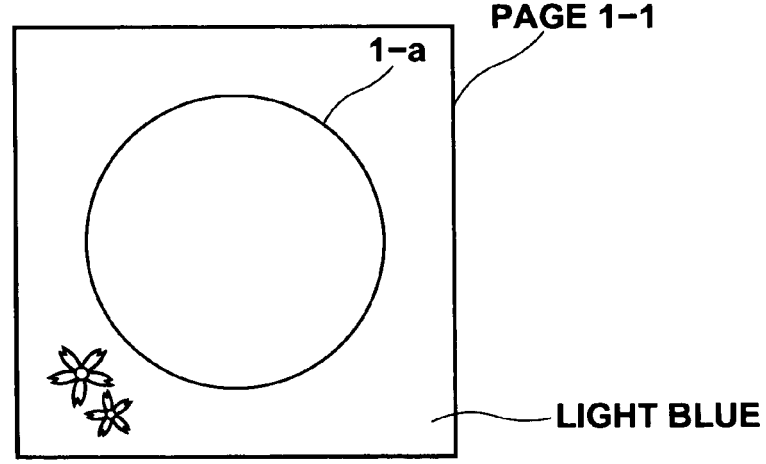
FIG. 15B is a diagram illustrating an example (No. 1) of album edit in the second embodiment.
Figure 15C:
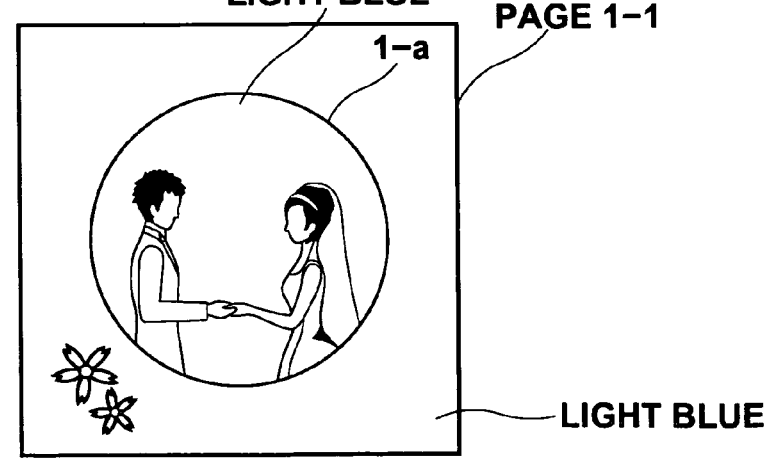
FIG. 15C is a diagram illustrating an example (No. 1) of album edit in the second embodiment.

For example, if an image G1 having a light blue background is included in the image group A as illustrated in FIG. 15A, page 1-1 corresponding to the light blue color information is selected, and displayed in the template display field 33, as illustrated in FIG. 15B. Therefore, a photo album may be produced so that the color of the template matches the color of the background of the image, as illustrated in FIG. 15C.

Figure 16A:
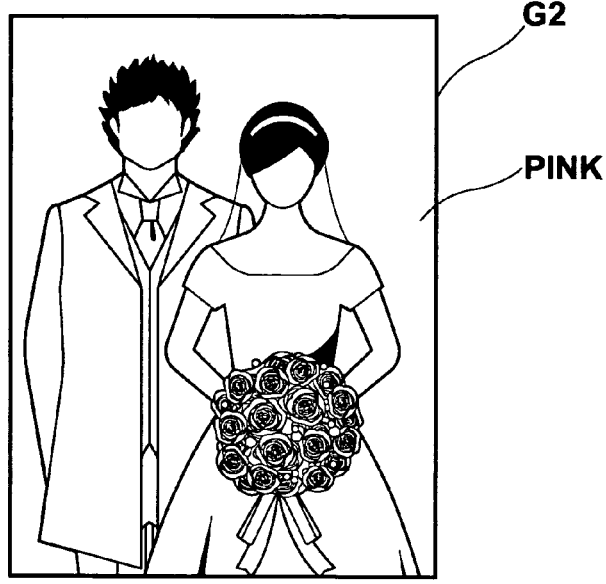
FIG. 16A is a diagram illustrating an example (No. 2) of album edit in the second embodiment.
Figure 16B:
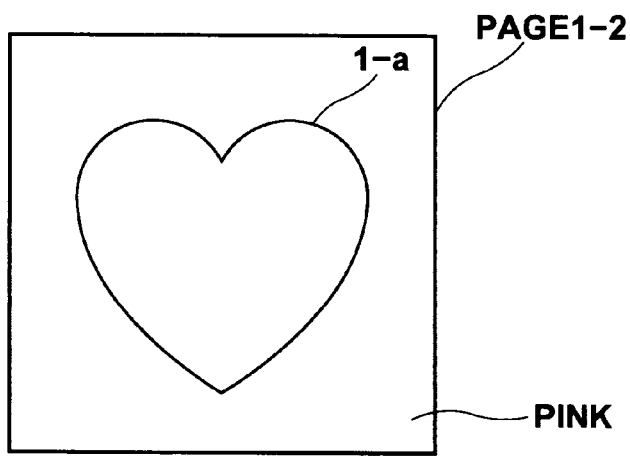
FIG. 16B is a diagram illustrating an example (No. 2) of album edit in the second embodiment.
Figure 16C:
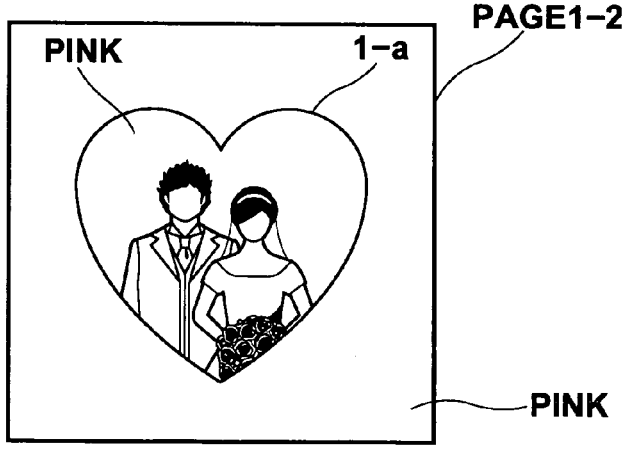
FIG. 16C is a diagram illustrating an example (No. 2) of album edit in the second embodiment.

Further, if an image G1 having a pink background is included in the image group A as illustrated in FIG. 16A, page 1-2 corresponding to the pink color information is selected, and displayed in the template display field 33, as illustrated in FIG. 16B. Therefore, a photo album may be produced so that the color of the template matches the color of the background of the image, as illustrated in FIG. 16C.

In the second embodiment as described above, when the operator clicks one of the scenes 1, 2, and 3, pages of the template may be displayed as a catalog of thumbnail images, and the operator may select a page by clicking a desired page in the catalog. Further, in each time when an image is selected in the catalog display field 31, the characteristic value of the scene of the selected image may be calculated, and a page of the template, which is appropriate for the calculated characteristic value (namely, color) may be displayed in the template display field 33.

In the embodiment described above, the processed image data of the selected images are printed out in the mini-laboratory 3A or 3B, and the operator pastes the printouts on the photo album paper corresponding to the template for generating the photo album. However, the file server 5 may generate a composite image data representing an image (a photo album image) having the images selected by the operator and inserted in the image insertion areas in the template by combining the processed image data and the template data. The composite image data is outputted to the mini-laboratory 3A or 3B.

If the mini-laboratory 3A or 3B prints out the composite image data generated in this manner, the photo album may be generated by simply binding the print of the photo album image, without pasting the printouts on the paper.

In each of the embodiments described above, the photo album is generated by using the image data obtained by reading the images recorded on the developed film. However, a photo album may be generated by using image data obtained by a digital camera. In this case, the file server 5 comprises a media drive for reading the image data from a recording medium such as a memory card for storing the image data obtained by photography. The image data read out from the recording medium by the media drive are stored in the file server 5. Further, a photo album may be generated using image data obtained by a mobile phone with a built-in camera. In this case, the image data transmitted from the mobile phone with a built-in camera through the mobile phone network is stored into the file server 5.

In the each of the above-described embodiments, the file server 5 carries out the preparatory processing only on the image data selected by the operator of the photo album editing PC 1. However, all the image data may be stored in the file server 5 after the preparatory processing carried out thereon at the time of reception of the image data from the mini-laboratory 3A or 3B or from the scanner 3C. Furthermore, the photo album editing PC 1 may carry out the preparatory processing on all the image data sent from the file server 5 or on the image data selected for generation of the photo album.

In each of the embodiments as described above, the photo album editing PC 1 or the file server 5 may generate, based on layout information, data (album data) including a user image inserted in a template, and the data may be sent to a server or like, which can be accessed by the user, and stored. Accordingly, the user can check whether the photo album will be successfully produced before actual production of the photo album. Further, in this case, the user may select whether the photo album is produced by using the album data or the photo album is reedited.

What is claimed is:

1. An image editing apparatus, comprising:
a display unit for displaying various types of information;
an input unit for receiving input for a template comprising a plurality of pages and having a plurality of image insertion areas for inserting information that indicates a predetermined event including a plurality of scenes, a plurality of images of said predetermined event, and images corresponding to respective scenes of said plurality of scenes included in said predetermined event;
an image group generating unit for generating image groups by classifying said plurality of images into respective scenes of said plurality of scenes included in said predetermined event;
a scene selecting unit for receiving a selection of desired scene from among said plurality of scenes;
an image display control unit for generating a catalog of images classified in an image group that corresponds to said selected scene, and for displaying said catalog on said display unit;

a template display control unit for displaying a page of said template having an image insertion area for inserting an image that corresponds to said selected scene on said display unit; and an image selecting unit for receiving a selection of image to be inserted into said image insertion area from said catalog;

wherein said scene selecting unit displays a plurality of scene buttons, each representing each of said plurality of scenes, on the display unit, and receives a selection of scene button from among said plurality of scene buttons displayed on said display unit.

2. The image editing apparatus according to claim 1, wherein if the template includes a plurality of pages having a color corresponding to at least one of the plurality of scenes, the template display control unit further displays a page having the color corresponding to the selected scene on the display unit.

3. The image editing apparatus according to claim 1, wherein if said plurality of scenes is the scenes representing various formal activities conducted within said predetermined event, said scene selecting unit displays a plurality of scene buttons, each representing each of said plurality of scenes, on said display unit, in the order in which said formal activities took place in said event, and for receiving a selection of scene button from among said plurality of scene buttons displayed on said display unit.

4. The image editing apparatus according to claim 1, wherein the template is a template for a wedding.

5. The image editing apparatus according to claim 1, further comprising guide image display unit for displaying in each of the image insertion area or areas of the template, displayed on the display unit, a guide image for guiding the image or images to be inserted therein.

6. The image editing apparatus according to claim 1 further comprising an editing unit for editing the image or images inserted in the image insertion area or areas.

7. The image editing apparatus according to claim 6, wherein the editing unit carries out at least one of processing for changing the quality of the image or images, processing for reshaping the image or images, and processing for restoring the image or images on the image or images.

8. The image editing apparatus according to claim 1, wherein the selection of desired scene is performed by an operator.

9. The image editing apparatus according to claim 1, wherein the template can be edited by an operator.

10. The image editing apparatus according to claim 1, wherein the predetermined event can be edited by an operator.

11. The image editing apparatus according to claim 1, wherein the plurality of scenes can be edited by an operator.

12. The image editing apparatus according to claim 1, wherein the input unit sends and receives various types of information including the image data to and from a file server through a network.

13. The image editing apparatus according to claim 1, wherein the image groups, generated by the image group generating unit, classify said plurality of images into respective scenes by calculating one or more characteristic quantities of the images.

14. The image editing apparatus according to claim 13, wherein the characteristic quantities includes averages of red, green, and blue colors in the images.

15. The image editing apparatus according to claim 13, wherein the characteristic quantities includes at least one of lightness, saturation, hue, image composition, and a subject type of the scenes represented by the images.

16. The image editing apparatus according to claim 13, wherein characteristic quantity distances equal to or smaller than a predetermined threshold value serve to classify images into the same image group.

17. The image editing apparatus according to claim 13, wherein the one or more characteristic quantities are calculated by a file server separately from a photo album editing personal computer.

18. An image editing method, comprising the steps of:
receiving input for a template comprising a plurality of pages and having a plurality of image insertion areas for inserting information that indicates a predetermined event including a plurality of scenes, a plurality of images of said predetermined event, and images corresponding to respective scenes of said plurality of scenes included in said predetermined event;

generating image groups by classifying said plurality of images into respective scenes of said plurality of scenes included in said predetermined event;

receiving a selection of desired scene from among said plurality of scenes;

generating a catalog of images classified in an image group that corresponds to said selected scene, and displaying said catalog on a display means;

displaying a page of said template having an image insertion area for inserting an image that corresponds to said selected scene on said display means;

receiving a selection of image to be inserted into said image insertion area from said catalog;

displaying a plurality of scene buttons, each representing each of said plurality of scenes; and receiving a selection of scene button from among said plurality of scene buttons.

19. A computer-readable medium encoded with a computer program for executing an image editing method, said method comprising the steps of:
receiving input for a template comprising a plurality of pages and having a plurality of image insertion areas for inserting information that indicates a predetermined event including a plurality of scenes, a plurality of images of said predetermined event, and images corresponding to respective scenes of said plurality of scenes included in said predetermined event;

generating image groups by classifying said plurality of images into respective scenes of said plurality of scenes included in said predetermined event;

receiving a selection of desired scene from among said plurality of scenes;

generating a catalog of images classified in an image group that corresponds to said selected scene, and displaying said catalog on a display means;

displaying a page of said template having an image insertion area for inserting an image that corresponds to said selected scene on said display means;

receiving a selection of image to be inserted into said image insertion area from said catalog;

displaying a plurality of scene buttons each representing each of said plurality of scenes; and receiving a selection of scene button from among said plurality of scene buttons.

* * * * *